United States Patent [19]  
Harvey et al.

[11] Patent Number: 4,579,944  
[45] Date of Patent: Apr. 1, 1986

[54] DERIVATIZATION OF STARCH

[75] Inventors: Richard D. Harvey; Roger E. McPherson, both of Muscatine, Iowa

[73] Assignee: Grain Processing Corporation, Muscatine, Iowa

[21] Appl. No.: 715,050

[22] Filed: Mar. 22, 1985

Related U.S. Application Data

[63] Continuation of Ser. No. 399,726, Jul. 19, 1982, abandoned.

[51] Int. Cl.$^4$ .................... C08B 31/00; C08B 31/02; C08B 31/08; C08L 3/00
[52] U.S. Cl. .................... 536/102; 106/213; 127/32; 127/70; 127/71; 536/50
[58] Field of Search .............. 536/50, 102; 106/213; 127/32, 70, 71

[56] References Cited

U.S. PATENT DOCUMENTS

| | | | |
|---|---|---|---|
| 2,876,217 | 3/1959 | Paschall | 536/50 |
| 2,917,506 | 12/1959 | Caldwell et al. | 536/50 |
| 2,995,513 | 8/1961 | Paschall et al. | 210/731 |
| 3,320,080 | 5/1967 | Mazzarella et al. | 106/210 |
| 3,346,563 | 10/1967 | Shildneck et al. | 536/50 |
| 3,448,101 | 6/1969 | Billy et al. | 536/50 |
| 3,524,827 | 8/1970 | Johnson et al. | 536/50 |
| 3,532,751 | 10/1970 | Langher et al. | 564/292 |
| 3,624,070 | 11/1971 | Hunt | 536/50 |
| 3,637,656 | 1/1972 | Germino et al. | 536/50 |
| 3,649,616 | 3/1972 | Goldstein et al. | 536/50 |
| 3,721,575 | 3/1973 | Jarowenko | 106/213 |
| 3,728,332 | 4/1973 | Tessler et al. | 106/213 |
| 3,737,370 | 6/1973 | Jarowenko et al. | 162/175 |
| 3,770,472 | 11/1973 | Jarowenko | 106/213 |
| 3,842,005 | 10/1974 | Moser et al. | 210/727 |
| 3,930,877 | 1/1976 | Aitken | 106/287.22 |
| 3,973,985 | 8/1976 | Voight et al. | 106/213 |
| 4,011,392 | 3/1977 | Rudolph et al. | 106/213 |
| 4,029,885 | 6/1977 | Buikema | 536/50 |
| 4,119,487 | 10/1978 | Tessler | 536/50 |
| 4,127,563 | 11/1978 | Rankin et al. | 536/50 |
| 4,129,722 | 12/1978 | Iovine et al. | 536/102 |
| 4,279,658 | 7/1981 | Harvey et al. | 106/213 |

FOREIGN PATENT DOCUMENTS 167010 1/1977 Czechoslovakia.  
2055046 8/1978 Fed. Rep. of Germany.  
1505243 3/1978 United Kingdom.

OTHER PUBLICATIONS

Sorenson & Campbell; Preparative Methods of Polymer Chemistry, Interscience, 1968, pp. 369, 462 & 463.  
Roberts et al., "Basic Principles of Organic Chemistry", W. A. Benjamin, Inc., 1964, pp. 412 & 1106.  
Encyclopedia of Polymer Science & Technology, 1967, Interscience Pub., vol. 6, pp. 109, 110, 151, 152, 154 & 213.  
Skeist, Handbook of Adhesives, Runhold Pub. 1962, p. 324.

Primary Examiner—Ronald W. Griffin  
Attorney, Agent, or Firm—Neuman, Williams, Anderson & Olson

[57] ABSTRACT

Production of starch derivatives by reacting a starch derivatizing agent with chemically-mechanically gelatinized starch.

18 Claims, No Drawings

DERIVATIZATION OF STARCH

This application is a continuation of application Ser. No. 399,726, filed July 19, 1982, now abandoned.

This invention relates to the production of chemical derivatives of starch. More particularly, this invention relates to processes for preparation of derivatized starch pastes which are useful in papermaking, textile size, waste water treatment, ore treatment processes and so forth.

Derivatized starches are widely used as wet end additives in the papermaking process to improve fines and filler retention while increasing the strength characteristics of the resultant paper. A smaller, but no less important, papermaking application is in the size press and coating areas where such starches contribute to the strength and surface characteristics of the finished paper and, in addition, reduce the biological oxygen demand (BOD) contribution of the broke upon repulping. Derivatized starches are also widely used in ore recovery processes such as beneficiation processes for phosphate ore and in treating iron ore slimes waste from taconite operations.

Derivatized starches are generally marketed as dry, granular, ungelatinized products. In use, the starches must be reslurried in water and then gelatinized to produce a thoroughly dispersed derivatized starch paste.

Granular derivatized starches are generally prepared by reacting an alkaline (pH 11-12) starch slurry with a derivatizing reagent in the presence of a gelatinization inhibitor such as sodium chloride, sodium sulfate, etc. and at a temperature below the gelatinization temperature of the starch. Reaction times are characteristically 12 to 20 hours. Additional operations may be included in the process as required to obtain a product designed for a specific application. In any event, the reaction slurry must be adjusted to a more neutral pH and then washed to remove the gelatinization inhibiting salts.

These basic procedures, though widely used, entail certain problems. Thus, granule state reactions in aqueous slurries require the addition of gelatinization inhibitors to prevent granule swelling. Because of the need to maintain the starch in granular form reaction temperatures must be low (less than about 50° C.) to prevent gelatinization. Low reaction temperatures result in long, 12 hours or more, reaction times. The resultant highly alkaline reaction slurries must be neutralized prior to washing and drying and the added gelatinization inhibiting salts removed by washing. The washing operations, however, result in significant losses of both granular and the more highly derivatized, solubilized starch, contributing not only to reduced product yields but also to increased biological oxygen demand (BOD) and suspended solids loads in the waste water streams.

The present invention provides a highly advantageous process for preparing starch derivatives from pasted starch, that is, a dispersed and gelatinized starch which is pasted by a combination of chemical and mechanical means. U.S. Pat. No. 4,279,658 issued July 21, 1981 in the names of Richard D. Harvey (a co-inventor of the present process), Thomas L. Gallaher, Raymond Lee Mullikin and Thomas L. Small and relates to the gelatinization or pasting of starch by a process in which the starch is heated with a starch solvent and subjected to a shearing force to produce substantially instantaneously (i.e., within a period of about 5 minutes) a starch paste which is well dispersed and essentially homogeneous. The disclosure of U.S. Pat. No. 4,279,658 is incorporated herein by reference thereto.

Underlying the present invention is the unexpected discovery that starch pasted in accordance with the said U.S. patent is particularly adapted for the production of starch derivatives. With this pasted starch (hereafter referred to as chemically-mechanically gelatinized starch or C-M starch) derivatization can be accomplished quickly with high efficiency and utilizing reaction temperatures considerably lower than the temperatures normally required for producing starch derivatives by conventional granular state derivatization procedures. Furthermore, the degree of substitution (D.S.) that can be achieved in aqueous state granular reactions is typically less than 0.05 because preparation of starch derivatives having higher D.S. values often results in solubilization of the starch with consequent low product recovery and high waste water treatment costs. U.S. Pat. No. 3,721,575 discloses processes for derivatizating pasted or gelatinized starch using high reaction temperatures, i.e. over 100° C., with low reaction efficiencies. The present process is capable of producing starch derivatives having a high degree of substitution that is, (>0.3) with high reaction efficiencies, thus enabling the derivatized starch to be used in applications not possible with prior art products. The high degree of substitution is achieved without the use of organic solvents.

A principal object of the present invention is to provide processes for producing starch derivatives from chemically-mechanically gelatinized starch.

Another objective of the invention is to produce starch derivatives by processes exhibiting significantly improved reaction efficiencies as compared with prior art derivatizing processes.

Still another objective is to produce starch derivatives in significantly less time than is required with prior art processes.

Still another objective is to produce efficiently starch derivatives having higher degrees of substitution than prior art starch derivatives.

A further object of the invention is to provide processes for the derivatization of starch using appreciably lower reaction temperatures than prior art processes thereby reducing energy requirements.

The process of the invention comprises producing derivatized starch pastes from chemically-mechanically gelatinized starch by reacting with the starch a desired derivatizing agent. The derivatizing can be conducted simultaneously with the chemical-mechanical gelatinization process or subsequent to the starch gelatinization process. The derivatization reaction is conducted at relatively low temperatures, that is, a temperature not above 100° C., and preferably at temperatures below about 60° C.

Starches in general can be advantageously derivatized in accordance with this invention, including cereal grain and root starches such as potato, corn, rice, tapioca, wheat, sago starch and the like. The starch can be a native starch or a starch modified with acid or oxidizing agents. Known starch derivatizing agents can be utilized to prepare the starch derivatives including, for example, cationic monomeric halogenated alkyl or alkenyl amines such as 2-diethylaminoethyl chloride hydrochloride (DEAE), 4-chloro-2-butenyltrimethylammonium chloride (CBTC), 3-chloro-2-hydroxypropyltrimethylammonium chloride (CHPTA), acrylonitrile, phosphates, acetic acid, hypochlorites, propylene oxide, sodium chloracetate or sodium monochloracetate, carbon disulfide, melamine formaldehyde, urea formaldehyde, acetic anhydride, ethylene oxide, benzyl chloride, phosphoryl chloride, epichlorohydrin, aldehydes generally including formaldehyde, paraformaldehyde and glutaraldehyde, acid anhydrides including acetic, succinic, adipic, maleic and malonic anhydride, chloropropionic acid, vinyl sulfone, benzoyl chloride, acrylates and acid chlorides and the like.

The derivatization of the starch is conducted by treating an aqueous slurry of a chemical-mechanical starch paste with a desired derivatizing agent. Alternatively, the selected derivatizing agent can be added to an aqueous slurry of ungelatinized starch and the starch then gelatinized in accordance with the process of U.S. Pat. No. 4,279,658. The amount of derivatizing agent can be varied depending upon the starch derivative desired and its intended application.

Typical conditions for derivatizing starch in accordance with this invention are summarized in Table I.

dure described in U.S. Pat. No. 4,279,658 and specifically in Example 1 thereof.

Samples of the starch pastes were derivatized with 3-chloro-2-hydroxypropyltrimethylammonium chloride (CHPTA) using concentration levels and temperatures shown in the table below. The derivatizing reagent 3-chloro-2-hydroxypropyltrimethylammonium chloride was agitated with the starch paste for periods as shown in the table.

To terminate the reaction, the samples were diluted in the ratio of 150 milliliters water to 75 milliliters of paste and the pH was adjusted to 6.7 to 7.3 with concentrated hydrochloric acid. To determine the degree of substitution and reaction efficiency, the derivatized starch was precipitated by adding 200 milliliters of methanol and agitating the mixture in a blender. After settling, the supernatant was decanted and the methanol treatment was repeated twice to remove unreacted reagent. Then the starch slurry was dried, ground and assayed for

TABLE I

| Reagent | CHPTA | Acrylo-nitrile | Sodium Trimetaphosphate | Acetic Anhydride | Sodium Hypochlorite | Propylene Oxide |
|---|---|---|---|---|---|---|
| Starch Concentration, % | 30 | 30 | 15 | 17 | 11 | 20 |
| Caustic Concentration, %* | 12 to 18 | 12 | 12 | 12 | 21 | 12 |
| Reagent Concentration, %* | 0.5–90 | 0.5–15 | 0.1–5 | 1–50 | 0.1–10 | 1–30 |
| Reaction Time, Minutes | 30–60 | 15–60 | 45–180 | few sec. | 5–60 | 5–300 |
| Reaction Temperature, °C. | 24–54 | 24–49 | 24–49 | 24–49 | 24–49 | 24–49 |
| Reaction Efficiency, % | 80 | 85 | 85 | 40 | | 40 |

*Based on Starch Dry Solids

The following examples illustrate the invention and the advantages thereof.

nitrogen by the Kjeldahl procedure.

|  | Run 1 | | Run 2 | | Run 3 | | Run 4 | |
|---|---|---|---|---|---|---|---|---|
| NaOH, % on d.s.[1] | 12 | | 12 | | 12 | | 12 | |
| CHPTA Concentration[2] | 3.05 | | 3.05 | | 4.5 | | 4.5 | |
| Reaction Temperature, °C. | 21 | | 49 | | 49 | | 49 | |
| Reaction Time, Min. | D.S.[3] | R.E.[4], % | D.S. | R.E., % | D.S. | R.E., % | D.S. | R.E., % |
| 5 | | | | | 0.010 | 25 | | |
| 10 | | | 0.0008 | 3 | | | 0.0144 | 36 |
| 15 | 0.0073 | 27 | | | 0.020 | 50 | | |
| 20 | | | | | | | 0.0241 | 60 |
| 25 | | | 0.0130 | 48 | 0.025 | 63 | | |
| 26 | | | | | | | 0.0269 | 67 |
| 37 | | | | | 0.026 | 65 | | |
| 40 | | | 0.0160 | 59 | | | | |
| 45 | | | | | | | 0.0319 | 80 |
| 47 | | | | | 0.026 | 65 | | |
| 55 | 0.0206 | 76 | 0.0118 | 44 | | | 0.0295 | 74 |
| 63 | | | 0.0115 | 42 | | | | |
| 70 | | | | | | | 0.0316 | 79 |
| 80 | 0.0177 | 65 | | | | | | |
| 185 | 0.0209 | 77 | | | | | | |

[1] NaOH concentrations used in starch gelatinization step
[2] % on starch dry solids
[3] D.S. as used throughout this application = $(N-N_o) \, 162$ where $N_o$ is the nitrogen equivalents in starch control and N is the nitrogen equivalents in the cationic starch derivative.
[4] % Reaction Efficiency (R.E.) as used throughout this application = moles of the substituent grouping incorporated in the starch divided by the moles of reagent used, multiplied by 100.

EXAMPLE 1

A 30% slurry (dry solids) of 65 Buel fluidity acid modified starch was converted into starch pastes using two different levels of sodium hydroxide, namely, 12% and 14% based on weight of dry solids starch. These starch pastes and the starch pastes in all of the following examples were prepared by the gelatinization proce- The reaction efficiencies obtained were as good or better than are obtained with conventional granular state derivatization processes which typically require 12 hours or more for completion.

EXAMPLE 2

Additional derivatization reactions were conducted with the reaction temperatures being varied from 21° to 54° C. Alkaline pasted starch was produced as in Example 1 except about 15% sodium hydroxide was used based on the dry solids weight of starch. The pasted starch was agitated and reacted with 4.5% (based on starch dry solids) 3-chloro-2-hydroxypropyltrimethylammonium chloride at the temperatures shown in the following table.

| Temperature °C. | D.S. | Reaction Efficiency, % | Minimum Time For Reaction Completion Hrs. |
|---|---|---|---|
| 21 | 0.028 | 70 | >4, <24 |
| 32 | 0.027 | 68 | >2, <24 |
| 43 | 0.028 | 70 | >1, <5.75 |
| 54 | 0.025 | 63 | 1 |

The above results show that reaction rate increased with increasing reaction temperatures but reaction efficiency was higher at lower temperatures. In practice, the reaction temperature is selected to achieve optimum reaction rate and reaction efficiency.

EXAMPLE 3

This example illustrates conducting the derivatization reaction simultaneously with the starch gelatinization. In this example the starch as anhydroglucose units (AGU), sodium hydroxide and 3-chloro-2-hydroxypropyltrimethylammonium chloride were combined in a molar ratio of 1:0.514:0.03994 and introduced into a mixing device as described in Example 1 of U.S. Pat. No. 4,279,658. The mixture was then held in the mixing device at a temperature of 21° C. and samples were withdrawn for analysis at the times shown below.

| Reaction Time, Hrs. | D.S. | Reaction Efficiency, % |
|---|---|---|
| 0 | 0.0013 | 3.1 |
| 1 | 0.016 | 40 |
| 3.75 | 0.029 | 73 |
| 6.5 | 0.030 | 75 |
| 24 | 0.030 | 75 |

The results show that the derivatizing reagent can be mixed with the starch before gelatinizing the starch and the gelatinization and derivatization reactions conducted simultaneously.

EXAMPLE 4

This example shows the effect of the amount of cationic reagent used in relation to starch on the degree of substitution and reaction efficiency. The starch paste was prepared as in Example 1. The starch to sodium hydroxide mole ratio was 1:0.534. The cationic reagent, 3-chloro-2-hydroxypropyltrimethylammonium chloride, was agitated with the starch paste at various levels shown below at 21° C. and held for 24 hours. The derivatized starch pastes were analyzed as described in Example 1.

| Molar Ratio CHPTA: Starch | D.S. | Reaction Efficiency, % |
|---|---|---|
| 0.00550:1 | 0.0015 | 27 |
| 0.0218:1 | 0.014 | 64 |
| 0.0332:1 | 0.023 | 69 |
| 0.0507:1 | 0.037 | 73 |
| 0.0517:1 | 0.038 | 74 |
| 0.0662:1 | 0.051 | 77 |
| 0.1167:1 | 0.088 | 75 |
| 0.149:1 | 0.114 | 76 |
| 0.175:1 | 0.137 | 78 |

| Molar Ratio CHPTA: Starch | D.S. | Reaction Efficiency, % |
|---|---|---|
| 0.183:1 | 0.139 | 76 |

As shown, CHPTA to Starch ratios of 0.0507 and higher resulted in maximum reaction efficiencies.

EXAMPLE 5

This example shows the derivatization reaction efficiency as a function of time when conducted at 49° C. Pasted starch was prepared as in Example 1 and was mixed with CHPTA. The mole ratio of CHPTA to starch was 0.056 to 1 or about 6.3% CHPTA on starch (dry solids basis). The mixture was held at 49° C. with agitation and samples were withdrawn at the intervals to determine reaction efficiency and degree of substitution. The results were as follows:

| Reaction Time, Min. | D.S. | Reaction Efficiency, % |
|---|---|---|
| 15 | 0.036 | 64 |
| 30 | 0.041 | 73 |
| 45 | 0.042 | 75 |
| 60 | 0.041 | 73 |
| 90 | 0.042 | 75 |
| 120 | 0.042 | 75 |

A reaction time of 45 minutes provided maximum reaction efficiency and degree of substitution (D.S.).

EXAMPLE 6

One application of derivatized starches is in the treatment of waste water from iron ore flotation processes. These processes create very large volumes of turbid waste waters which are high in silicates and which are referred to as slimes. In the past these slimes were usually dumped into natural waterways without any purification step in the waste water disposal. However, modern environmental protection laws mandate the impoundment of such waste waters, and economic motives dictate that the water in the slimes be recycled to the iron ore beneficiation process.

Although huge impoundments are currently being used, and given sufficient time, the slimes will settle out, it has been necessary to employ synthetic flocculents in order to achieve a reasonable turnaround time for the water. The usual criterion for the reuse of water in iron ore beneficiation processes is that it be no more turbid than 200 nephelometric turbidity units (n.t.u.) as determined in a Ratio Turbidimeter obtained from Hach Chemical Co., Loveland, Colo. 80537.

Preparations of cationic chemical-mechanical starch derivatives were made at various molar ratios of CHPTA to starch. In the following table R=molar ratio of CHPTA to starch. These preparations were tested for their ability to treat iron ore slimes using different dilutions of each preparation mixed with a sample of iron ore slimes from Minnesota Taconite, Company, Mountain Iron, Minn. In these tests one-liter beakers containing 1000 milliliters of slimes were placed on a Phipps and Bird, Inc. Model No. 300, paddle-bladed gang stirrer and agitated for three minutes at a setting of 100 revolutions per minute. The cationic starch derivative dilutions were added to different beakers of the slimes (except for one untreated control) and the stirring was continued for three minutes at 100 revolutions per minute. The speed then was reduced to 50 revolutions per minute for one minute and finally to 10 revolutions per minute for one minute after which the stirrers were shut off and the solution allowed to settle for five minutes. Aliquots were decanted from the top 5 inch of each beaker and turbidities determined on a Hach Ratio Turbidimeter. Curves were plotted of the dilutions that bracketed 200 nephelometric turbidity units from which the amount of the cationic starch derivative required to produce a turbidity of 200 nephelometric turbidity units was calculated. The results are summarized below:

| Flocculent | D.S. | Reaction Efficiency, % | Effective Derivative Concentration, PPM |
|---|---|---|---|
| R = 0.005 | 0.00014 | 3 | 6.2 |
| R = 0.010 | 0.0036 | 36 | 4.7 |
| R = 0.020 | 0.011 | 55 | 3.9 |
| R = 0.0372 | 0.022 | 59 | 3.8 |
| R = 0.061 | 0.037 | 61 | 3.5 |
| R = 0.0848 | 0.054 | 64 | 2.8 |
| R = 0.1053 | 0.066 | 63 | 2.5 |
| R = 0.1384 | 0.094 | 68 | 2.3 |
| R = 0.1611 | 0.11 | 68 | 2.0 |
| R = 0.188 | 0.14 | 74 | 1.4 |
| R = 0.300 | 0.23 | 77 | 1.32 |
| R = 0.400 | 0.28 | 70 | 1.27 |
| R = 0.800 | 0.44 | 55 | 1.10 |
| Corn starch paste | | | not effective |

The above results show that CHPTA derivatized starch can be advantageously used to treat iron ore slimes successfully whereas underivatized corn starch paste was not effective. It is also seen that starch derivatives having higher degrees of substitution are more effective.

EXAMPLE 7

This example illustrates a typical prior art derivatization process using granular (non-gelatinized) starch. An aqueous 40% (dry solids) slurry of a 65 Buel fluidity, acid-modified corn starch (non-gelatinized) was brought to thermal equilibrium in a 43° C. water bath. A caustic-brine solution was prepared by mixing 1.5% sodium hydroxide (wt/wt) on the starch (dry solids) as a 30% sodium hydroxide solution (wt/wt) and 10% sodium chloride based on the water in the starting slurry as a 26% sodium chloride solution (wt/wt). The sodium hydroxide/sodium chloride solution was slowly added to the well-agitated slurry. The reaction mixture was then charged with 2.90% acrylonitrile (AN) on dry solids starch. Samples were collected at regular intervals and immediately adjusted to pH 5.5–6.0 with 5N aqueous hydrochloric acid. Each slurry sample was vacuum filtered, washed on a Beuchner funnel with ½ volume warm tap water, and dried overnight in a forced air oven at 50° C. Kjeldahl nitrogen and standard acid-base titration carboxyl analyses were carried out on the dried samples. Calculated values are the sum of the substituent —$CH_2CH_2CN$ and —$CH_2CH_2CO_2H$ groups.

| Sample No. | Reaction Time, Hrs. | D.S., %** | Reaction Efficiency, %* |
|---|---|---|---|
| 1 | 0 | 0 | 0 |
| 2 | 2 | 0.0613 | 69 |
| 3 | 4 | 0.0697 | 78 |
| 4 | 7.33 | 0.0703 | 79 |
| 5 | 23.75 | 0.0670 | 76 |

*Reaction Efficiency = $\frac{D.S.}{AN: \text{starch mole ratio}} \times 100$

**D.S. = $\frac{162 \left( \frac{M.W.S.G.}{W.A.G.} \times \% \text{ A.G.} \right)}{(M.W.S.G. \times 100) - M.W.S.G. \left( \frac{M.W.S.G.}{W.A.G.} \times \% \text{ A.G.} \right)}$ M.W.S.G. = molecular weight of substituent group
W.A.G. = weight of analyzed group

EXAMPLE 8

This example provides a comparison of the process of this invention with the prior art process of Example 7. A chemically-mechanically gelatinized starch paste was prepared using a 30%. d.s. slurry of a 65 Buel fluidity acid-modified corn starch. The starch paste was prepared as in Example 1. The starch paste contained 25.9% starch (dry solids) and 11.9% sodium hydroxide on starch (dry solids). The converted or gelatinized starch paste was thermally equilibrated in a water bath at 35° C. and then mixed with 2.89% acrylonitrile on starch (dry solids basis).

Periodically, samples were removed and the viscosity measured using a Brookfield viscometer. Each sample was then quickly adjusted to pH 5.5–6.0 with 5N aqueous hydrochloric acid, precipitated and washed with methanol to remove unreacted reagent, vacuum filtered, and the wet cake dried overnight in a forced air oven at 50° C. The dried starch derivative was brought to a fine consistency by grinding in a mill. Kjeldahl nitrogen and standard acid-base titration carboxyl analyses were carried out on the dried samples. The results are shown below:

| Sample No. | Reaction Time, Hrs. | D.S., % | Reaction Efficiency, % |
|---|---|---|---|
| 1 | 0 | 0 | 0 |
| 2 | 0.25 | 0.0730 | 83 |
| 3 | 0.70 | 0.0750 | 85 |
| 4 | 1.15 | 0.0710 | 81 |
| 5 | 2.60 | 0.0620 | 70 |
| 6 | 23.28 | 0.0638 | 72 |

The reaction was completed in about 0.25 to 0.70 hours versus 4 hours with the prior art procedure (Example 7) and the reaction efficiency was better than with granular starch.

EXAMPLE 9

This example illustrates a typical prior art derivatization process using granular (non-gelatinized) starch and sodium trimetaphosphate as the derivatizing agent. An aqueous 40% (dry solids) slurry of a 65 Buel fluidity acid-modified corn starch (non-gelatinized) containing 1.5% sodium hydroxide on starch (dry solids) and 4% hydrochloric acid based on the water in the slurry was prepared. The resultant starch slurry/caustic/brine combination was then treated with sodium trimetaphosphate (STMP; 0.5% as is on dry solids starch) at 35° C. Periodically samples were removed and processed as described in Example 7. The phosphorus content of the starch phosphate product was determined by atomic absorption procedures. The results are shown below:

| Sample No. | Reaction Time, Hrs. | % P on d.s. Starch | Reaction Efficiency, % |
| --- | --- | --- | --- |
| 1 | 0 | 0.017 | 0 |
| 2 | 2 | 0.023 | 5.3 |
| 3 | 4 | 0.033 | 14.2 |
| 4 | 7.33 | 0.035 | 26.5 |
| 5 | 22.75 | 0.045 | 35.4 |

EXAMPLE 10

This example provides a comparison of the process of this invention with the prior art process of Example 9. A chemical-mechanical paste as prepared in Example 8 was diluted with tap water to a level of 15% dry solids and then reacted with 0.25% sodium trimetaphosphate (STMP) as is on dry solids starch at 35° C. Sampling and product recovery procedures were as described in Example 8. The phosphorus content of the resultant starch phosphate derivative was determined by atomic absorption. The results are shown below:

| Sample No. | Reaction Time, Hrs. | % P on d.s. Starch | Reaction Efficiency, % |
| --- | --- | --- | --- |
| 1 | 0 | 0.005 | 0 |
| 2 | 0.3 | 0.024 | 33.9 |
| 3 | 0.6 | 0.027 | 39.3 |
| 4 | 1.15 | 0.043 | 67.9 |
| 5 | 2.17 | 0.048 | 76.8 |
| 6 | 24.53 | 0.053 | 85.7 |

The results show that the derivatization reaction for starch phosphate production in accordance with this invention was faster and more efficient than with the prior art granular process (Example 9) even with the use of one-half the phosphate reagent concentration.

EXAMPLE 11

A known amount of a chemically-mechanically converted starch paste prepared as described in Example 8 was placed in a two-liter resin-pot fitted with overhead stirrer and pH electrodes. Water was added to decrease the paste concentration to approximately 17% dry solids. The system was brought to 35° C. in a water bath and quickly charged with 0.5 mole acetic anhydride per mole of starch dry solids. After several seconds, sufficient $H_2SO_4$ (2N) was added to lower the paste pH to 4.5, thereby terminating the reaction. The resultant starch paste was recovered as described in Example 8. The acetyl content was determined using procedures described in "Methods in Carbohydrate Chemistry", Roy L. Whistler, ed., Vol. IV, Academic Press, New York, N.Y., 1964, p. 288. Analytical results show the product had a degree of substitution of 0.20 which is equivalent to a 41% reaction efficiency.

EXAMPLE 12

An aqueous 12% dry solids slurry of unmodified corn starch was gelatinized by the chemical-mechanical process of U.S. Pat. No. 4,279,658. The product contained 10.8% dry solids starch, and 20.9% sodium hydroxide on dry solids starch. Portions of the starch paste were placed in a constant temperature bath and equilibrated to a temperature of 43° C. Each sample was treated with a different percentage of active chlorine (on starch dry solids) and allowed to react for two hours at 43° C. At the end of the reaction time each sample was treated with sodium bisulfite to stop the reaction. Reaction termination was confirmed by a negative sulfuric acid/potassium iodide spot test. Paste samples were adjusted to pH 1.0 with concentrated hydrochloric acid and prepared for analysis as described in Example 8. Carboxyl analyses by standard acid-base titrations were carried out on the resulting dried starches. The results are shown below:

| % Active Chlorine on Starch d.s. | % Carboxyl on Starch d.s. |
| --- | --- |
| 0.00 | 0.114 |
| 1.40 | 0.166 |
| 2.05 | 0.193 |
| 3.35 | 0.278 |
| 4.26 | 0.328 |
| 5.32 | 0.377 |

A plot of the data of the above table shows a linear increase with increasing concentration of active chlorine when both values are based on dry solids starch.

EXAMPLE 13

This example illustrates a typical prior art derivatization process using granular (non-gelatinized) starch and propylene oxide as the derivatizing agent. A 40% dry solids aqueous slurry of a 65 Buel fluidity acid-modified corn starch was mixed with a caustic-brine solution and thermally equilibrated at a temperature of 43° C. The caustic-brine solution was prepared by mixing 1.5% sodium hydroxide (wt/wt) on the starch (dry solids) as a 30% sodium hydroxide solution (wt/wt) and 10% sodium chloride based on the water in the starting slurry as a 26% sodium hydroxide solution. The sodium hydroxide/sodium chloride solution was slowly added to the well-agitated slurry. After the mixture reached 43° C., it was charged with 10% propylene oxide, as is, on dry solids starch. Samples were taken and prepared for analysis as described in Example 7. Zeisel percent alkoxyl values were determined on the dry products. The results are shown below:

| Sample No. | Reaction Time, Hrs. | D.S., % | Reaction Efficiency, % |
| --- | --- | --- | --- |
| 1 | 0 | 0 | 0 |
| 2 | 2 | 0.022 | 8 |
| 3 | 4 | 0.032 | 12 |
| 4 | 7.83 | 0.052 | 19 |
| 5 | 22.75 | 0.098 | 35 |

EXAMPLE 14

This example provides a comparison of the process of this invention with the prior art process of Example 13. A chemically-mechanically gelatinized starch paste prepared as in Example 8 was diluted with tap water to 20% dry solids, equilibrated to 35° C., in a water bath, and then treated with 10% propylene oxide on dry solids starch. Sampling and recovery procedures were as described in Example 8. Zeisel alkoxyl determinations were carried out on the dried products. The results are shown below:

| Sample No. | Reaction Time, Hrs. | D.S., % | Reaction Efficiency, % |
| --- | --- | --- | --- |
| 1 | 0 | 0 | 0 |
| 2 | 0.33 | 0.044 | 16 |
| 3 | 0.53 | 0.045 | 16 |

-continued

| Sample No. | Reaction Time, Hrs. | D.S., % | Reaction Efficiency, % |
|---|---|---|---|
| 4 | 0.95 | 0.060 | 22 |
| 5 | 1.88 | 0.083 | 30 |
| 6 | 19.12 | 0.122 | 44 |

The reaction of propylene oxide with the chemically-mechanically gelatinized starch was better than with granular starch both from the standpoint of rate of reaction and reaction efficiency.

EXAMPLE 15

Derivatization reactions were run on the chemically-mechanically gelatinized starch to form a starch xanthate derivative, a starch urea formaldehyde derivative and a starch melamine formaldehyde derivative.

In the case of the starch xanthate, chemically-mechanically gelatinized starch was reacted in a Waring Blender at room temperature with carbon disulfide at a mole ratio of 1:0.11, starch to carbon disulfide. A sample of the product was washed, dried and examined by infrared spectrophotometry. Absorbance was found at a frequency of 2590–2540 correlating to a C-S bond indicating the product contained bound carbon disulfide.

With the starch urea formaldehyde and melamine formaldehyde derivatives, 1000 grams of chemically-mechanically gelatinized starch paste were reacted as above with 5% active reagent on a dry solids basis. In both cases the viscosity of the reaction mixture increased dramatically and became a rigid gel in about 15 minutes, evidence of a rapid reaction rate.

The advantages of the invention are apparent from the foregoing. By means of the invention derivatized starch products can be readily and efficiently prepared. Starch derivatives having a high degree of substitution can be prepared in short periods with reduced energy requirements. The invention eliminates the problems encountered in producing derivatives of granular starch, such as the need for swelling inhibitors which generate high biological oxygen demands in waste water effluents. The processes of the invention permit production of derivatized starch products in much shorter time periods than are required in granular state starch derivatization procedures.

Those modifications and equivalents which fall within the spirit of the invention are to be considered a part thereof.

What is claimed is:

1. A process for preparing a starch derivative which comprises:
   (a) preparing a starch paste by bringing together an aqueous slurry of starch and a starch solvent and without the application of external heat imparting thereto a shearing force which is sufficient to provide in less than 5 minutes a gelatinized, dispersed, essentially homogeneous starch paste having a viscosity ranging from about 1.0 to about 2.0 times the shear stable viscosity of the starch paste,
   (b) reacting for a period of not more than about 180 minutes at a temperature of not above 100° C. with said starch paste a derivatizing agent, and
   (b) recovering a derivatized starch paste.

2. A process in accordance with claim 1 wherein the reaction with the derivatizing agent is conducted at a temperature of not above 60° C.

3. A process in accordance with claim 2 wherein the derivatizing agent is an oxidizing agent and reaction of the starch paste is conducted for a period of not more than about 60 minutes.

4. A process in accordance with claim 2 wherein the derivatizing agent is an aldehyde derivatizing agent and reaction of the starch paste is conducted for a period of not more than 60 minutes.

5. A process in accordance with claim 2 wherein the derivatizing agent is an ether-forming derivatizing agent.

6. A process in accordance with claim 2 wherein the derivatizing agent is an acid anhydride or acyl halide derivatizing agent and reaction of the starch paste is conducted for a period of not more than 15 minutes.

7. A process in accordance with claim 2 wherein the derivatizing agent is a monomeric halogenated alkyl or alkenyl amine.

8. A process in accordance with claim 2 wherein the derivatizing agent is acrylonitrile and reaction of the starch paste is conducted for a period of not more than 60 minutes.

9. A process in accordance with claim 2 wherein the derivatizing agent is a phosphate and reaction of the starch paste is conducted for a period of not more than 60 minutes.

10. A process in accordance with claim 2 wherein the derivatizing agent is a hypochlorite and reaction of the starch paste is conducted for a period of not more than 60 minutes.

11. A process in accordance with claim 2 wherein the derivatizing agent is propylene oxide.

12. A process in accordance with claim 2 wherein the derivatizing agent is urea formaldehyde and reaction of the starch paste is conducted for a period of not more than 15 minutes.

13. A process in accordance with claim 2 wherein the derivatizing agent is melamine formaldehyde and reaction of the starch paste is conducted for a period of not more than 15 minutes.

14. A process in accordance with claim 2 wherein the derivatizing agent is carbon disulfide and reaction of the starch paste is conducted for a period of not more than 15 minutes.

15. A process in accordance with claim 2 wherein the derivatizing agent is an acid anhydride and reaction of the starch paste is conducted for a period of not more than 15 minutes.

16. A process in accordance with claim 2 wherein the derivatizing agent is acetic anhydride and reaction of the starch paste is conducted for a period of not more than 15 minutes.

17. A process in accordance with claim 2 wherein the derivatizing agent is 3-chloro-2-hydroxypropyltrimethylammonium chloride and reaction of the starch paste is conducted for a period of not more than 60 minutes.

18. A process in accordance with claim 1 wherein steps (a) and (b) are conducted simultaneously.

* * * * *